APPARATUS AND METHOD FOR REPAIRING EQUIPMENT

Filed June 19, 1967

INVENTOR
ROYCE F. EVANS
by Hood, Gust, & Irish
ATTORNEYS

INVENTOR
ROYCE F. EVANS
by Hood, Gust & Irish,
ATTORNEYS 3,437,390

APPARATUS AND METHOD FOR REPAIRING EQUIPMENT

Royce F. Evans, New Haven, Ind., assignor to Tele-Quick Corporation, New Haven, Ind., a corporation of Indiana Filed June 19, 1967, Ser. No. 647,162
Int. Cl. A47b *83/00, 17/00, 19/00*
U.S. Cl. 312—237 11 Claims

ABSTRACT OF THE DISCLOSURE

An apparatus for facilitating an improved method for repairing and servicing television and radio equipment, which apparatus comprises a pedestal upon which is mounted a cabinet containing instruments for repairing and servicing the equipment, a table arranged for rotation about the axis of the pedestal and a plurality of dollies, each of which is arranged to be selectively latched to the table for rotation therewith. The method comprises the steps of placing the equipment to be repaired on a dolly, releasably connecting the dolly to the table, repairing the equipment using the instruments in the cabinet, and disconnecting the dolly from the table.

BACKGROUND OF THE INVENTION

*Field of the invention*

The present invention relates generally to apparatus and method for repairing electronic equipment, and more particularly to the provision of an apparatus which facilitates an improved method for repairing and servicing equipment, such as television sets, radios, and the like.

*Description of the prior art*

Heretofore, work benches have been arranged to facilitate the repair of television sets, radios and the like. That is, prior art, stationary work benches have been arranged such that a piece of equipment, such as a television set, is manually deposited thereon and repaired in situ, the necessary servicing equipment usually being manually brought to the set during the testing and repair. Upon completion of the work, the servicing equipment is returned to its normal storage location to be used later for another repairing job.

SUMMARY OF THE INVENTION

The present invention comprises an apparatus and method for repairing equipment, such as television sets and the like. This comprises a pedestal, a multi-sided table journalled for rotation about the vertical axis of the pedestal and a stationary cabinet supported on the pedestal above the table, the cabinet being arranged to contain the instruments necessary for repair and service of the equipment. A plurality of dollies are provided, each of the dollies being arranged to abut against a side of the table and to be connected to the table for rotation therewith.

In the practice of the present invention, the pieces of equipment to be repaired are placed on a dolly, the dolly is moved to the rotary table and releasably connected to one side thereof, the equipment is repaired using the instruments contained in the cabinet mounted on the pedestal, and the dolly supporting the equipment is disconnected from the rotary table and moved away therefrom after the equipment is repaired.

Latch means are provided on each dolly to facilitate the connection thereof to the rotary table. Preferably, the top surface of each dolly is flush and parallel with the top surface of the rotary table so that when the dolly is connected to the latter, the equipment can be moved easily from the dolly onto the table.

It is an object of the present invention, therefore, to provide a work bench which facilitates the repairing and servicing of equipment such as television sets and the like.

Another object of the present invention is to provide such a work bench which comprises a cabinet mounted on a pedestal and a table arranged to rotate about the axis of the pedestal relative to the cabinet, the cabinet containing the necessary instruments for repairing and servicing the equipment.

Still another object of the present invention is to provide such a work bench further comprising a plurality of dollies for supporting equipment to be repaired, each of the dollies being arranged to be connected to the rotary table to be movable therewith.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENT

Figure 2:
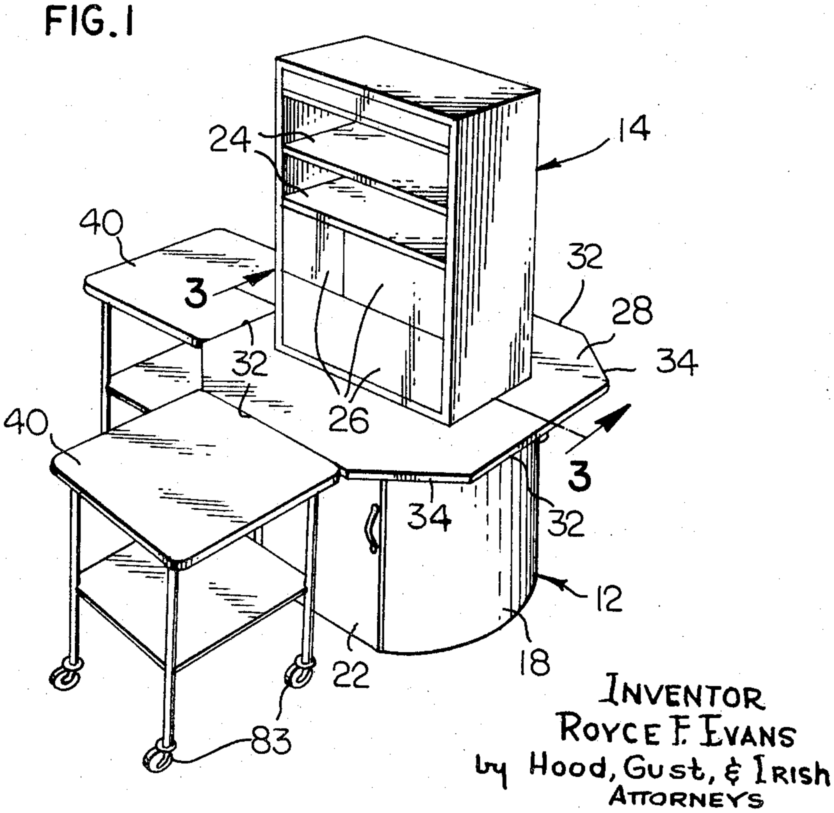
FIG. 2 is a perspective view of the work bench of the present invention.
Figure 3:
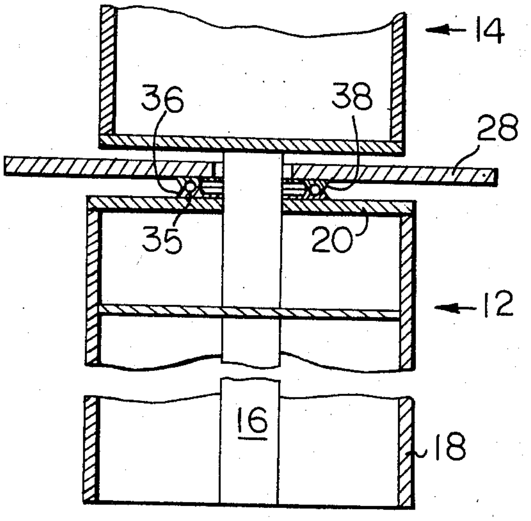
FIG. 3 is a fragmentary, sectional view taken from FIG. 2 generally along the line 3—3 and showing the means for journalling the multi-sided table on the pedestal which supports the cabinet.

The work bench of the present invention, indicated generally by reference numeral 10, comprises a pedestal 12 upon which is mounted a stationary cabinet 14, the pedestal and cabinet being indicated generally by their respective reference numerals. Referring to FIG. 3, it will be seen that the pedestal 12 comprises a center post 16 which supports the cabinet 14 and an enclosure 18 having a horizontal, flat top wall 20, the enclosure 18 providing storage space about the center post 16. Referring to FIG. 2, it will be seen that a door 22 is arranged to provide access to the storage space defined by the enclosure 18.

The cabinet 14 is provided to store the instruments necessary to repair and service equipment on the work bench 10. In the illustrative embodiment of FIG. 2, the cabinet 14 is provided with a plurality of shelves 24 above a plurality of storage openings 26 which may receive larger pieces of equipment such as power supplies, oscilloscopes, volt meters, variable frequency generators and the like. It will be noted that the work bench 10 is ideally suited for repairing and servicing television sets and the like. Thus, the following description will be directed toward the repairing and servicing of television sets. It will be apparent, however, that the work bench 10 is suitable for use in repairing and servicing other types of equipment.

Figure 1:
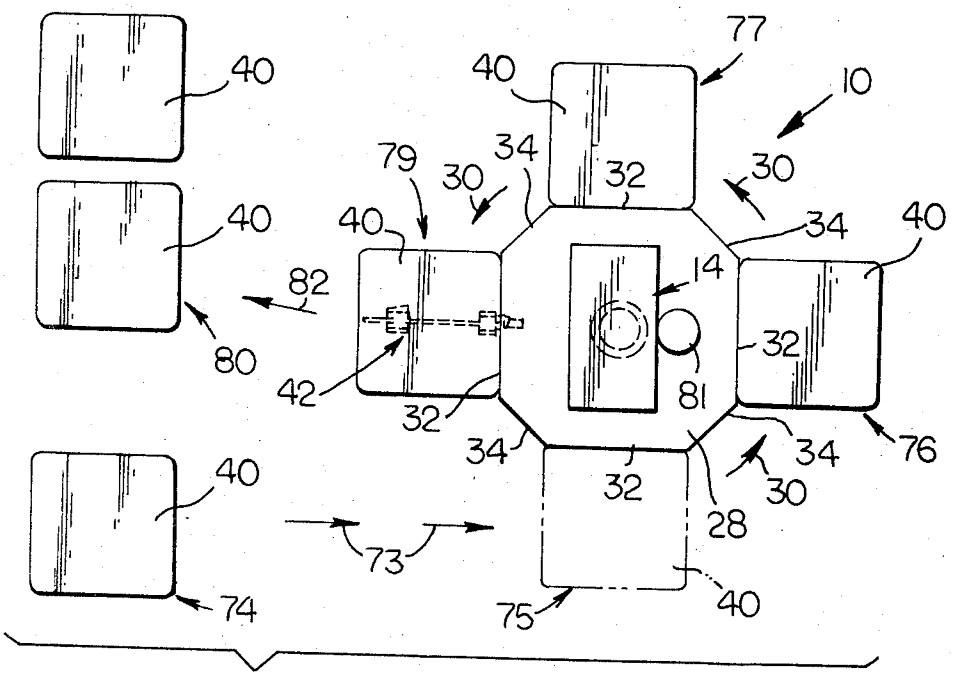
FIG. 1 is a somewhat diagrammatical top plan view showing one embodiment of the present invention.

A multi-sided table 28 is journalled for rotation about the axis of the pedestal 12 in the direction of the arrows 30 (FIG. 1), the axis of the pedestal 12 preferably coinciding with the center of the table 28. Referring to FIG. 1, it will be seen that the illustrative table 28 has eight sides, four of which are indicated by the reference numerals 32 and four of which are indicated by reference numerals 34. Preferably, all the sides 32 are of the same length and all the sides 34 are of the same length.

In the illustrative embodiment of FIG. 3, the table 28 is supported for rotation about the post 16 on the top wall 20 of the enclosure 18. Specifically, the table 28 is supported on an annular bearing which is concentric with the axis of the post 16, the bearing comprising an upwardly opening race 36 mounted on the top surface of the top wall 20 and a downwardly opening race 38 mounted on the bottom surface of the table 28. Roller means such as ball bearings 35 are carried between the races 36 and 38 in a conventional manner.

A plurality of dollies 40 are provided, each of the dollies 40 being arranged to be latched to one of the sides 32 of the table 28. Preferably, each of the dollies 40 has a top surface which is flat and horizontal and which is the same height as the top surface of the table 28. It is also preferable that one side of the top surface of each of the dollies 40 be substantially the same length as the sides 32 of the table 28.

In the illustrative embodiment, four dollies 40 may be releasably connected to the table 28 at any one time. Thus, the work surface of the table 28 is effectively increased by the addition of the work (top) surfaces of the dollies 40. Since, in a preferred embodiment, the work surfaces of the dollies 40 are continuous with the work surface of the table 28, equipment may be easily moved from the dollies 40 onto the table 28 and then back onto the dollies.

Referring to FIG. 1, it will be seen that the four spaces bounded by the sides 34 and the adjacent sides of the dollies 40 are provided so that workmen standing in the spaces and working on equipment placed on the dollies will have access to the instruments contained in the cabinet 14. Thus, four workmen may work on equipment carried on four dollies 40 which are attached to the table 28, each of the four workmen having access to the instruments mounted on and carried in the cabinet 14.

Figure 4:
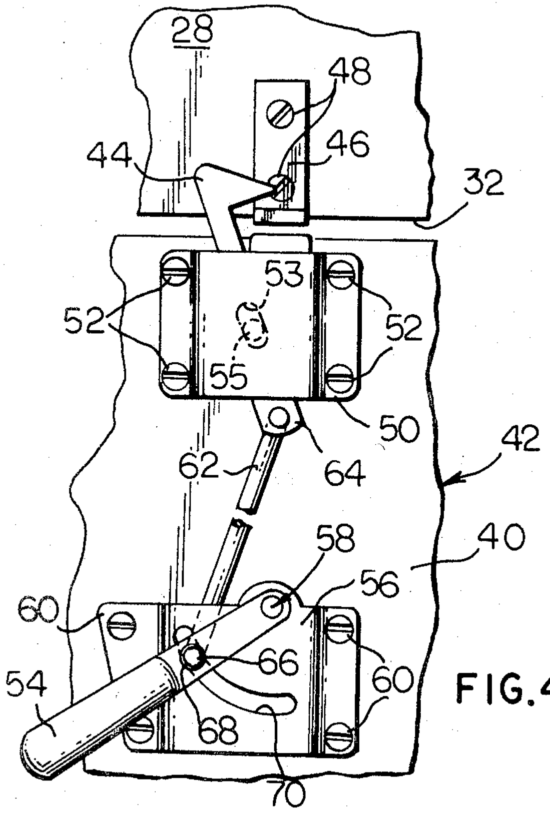
FIG. 4 is a fragmentary view showing a latch mechanism for connecting a dolly to one side of the multi-sided table.
Figure 5:
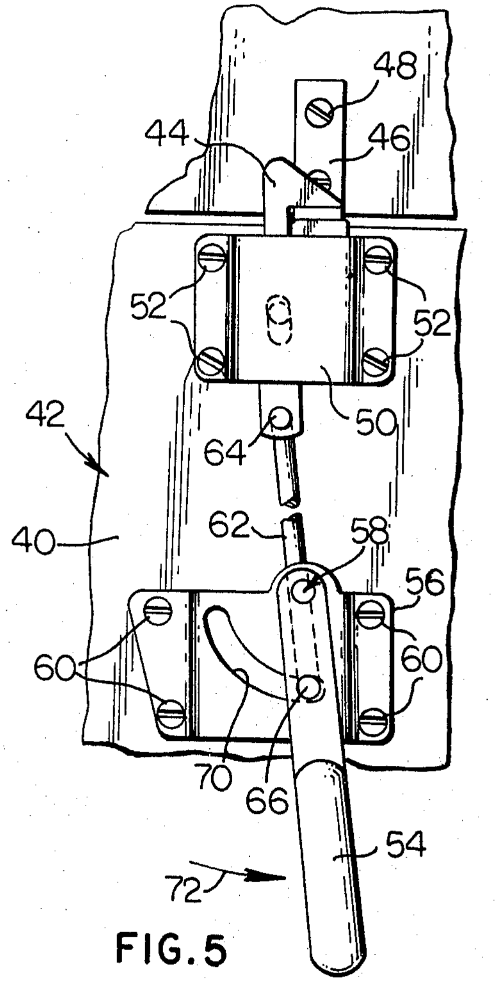
FIG. 5 is a fragmentary view showing the latch mechanism of FIG. 4 after it is actuated to connect the dolly to the multi-sided table.

Each of the dollies 40 is provided with a latch mechanism, indicated generally by reference numeral 42, which serves releasably to latch the dolly 40 to a side 32 of the table 28. Referring to FIGS. 4 and 5, it will be seen that each latch mechanism 42 comprises a latch 44 arranged to engage a keeper 46 disposed adjacent each side 32 of table 28. The illustrative keeper 46 is an L-shaped bracket secured to the bottom side of table 28 by means such as the screws 48. The latch 44 is rockably and slidably carried in a bracket 50 which is secured to the bottom side of the top platform of the dolly 40 by means such as the screws 52, the latch 44 having an elongated slot 53 receiving a pivot post 55 secured to the bracket 50. A lever 54 is mounted on a bracket 56 to be pivotally movable about an axis indicated by the reference numeral 58, the bracket 56 being secured to the bottom surface of the top platform of the dolly 40 by means such as the screws 60. A connecting rod 62 is connected between the rear end 64 of the latch 44 and a point on the lever 54 indicated by reference numeral 66. Specifically, the connecting rod 62 is provided with a lug-portion at each of its ends, the lug-portion at one of its ends extending through an opening in the end 64 of the latch 44 and the other lug-portion extending through an opening 68 in the lever 54. The lug-portion of the connecting rod 62 which extends through the opening 68 in the lever 54 also extends into and is slidably received in an arcuate slot 70 formed in the bracket 56.

When the lever 54 is moved from its position shown in FIG. 4 to its position shown in FIG. 5, the connecting rod 62 is placed in tension against the latch 44, thereby to engage the latch 44 with the keeper 46. Specifically, the arcuate slot 70 is arranged so when the lever 54 is pivoted in the direction of arrow 72, the lug-portion of connecting rod 62 which is received in slot 70 is moved to an overcenter position relative to the axis 58 to lock lever 54 in a position which holds latch 44 engaged with the keeper 46.

The latch mechanism 42 is arranged so the lever 54 extends outwardly toward the side of dolly 44 which is opposite to the side which abuts the side 32 of table 28. Thus, the latch mechanism 42 is easily operated releasably to connect dolly 40 to table 28 with one straight edge of the dolly 40 engaging a straight side 32 of the table 28.

As stated previously, the work bench 10 is ideally suited for repairing and servicing a quantity of television sets. In this use of the work bench 10, a television set to be serviced or repaired is placed on a dolly 40 which is, of course, movable independently of the rotary table 28 until the dolly is latched to the table 28.

In the preferred method for repairing and servicing a television set using the work bench 10, a television set to be repaired is placed on a dolly 40 located in the area indicated generally by the reference numeral 74. When a side 32 of the table 28 is open, the dolly 40 carrying the television set is moved in the direction of the arrows 73 (FIG. 1) to connect the dolly 40 to the table 28 in the position indicated generally by reference numeral 75. The television set is initially prepared for servicing in the position 75. By rotating the table 28, the television set is then located in the position indicated generally by reference numeral 76. In the position 76, a repairman may use a vacuum sweeper, the tank of the vacuum sweeper being indicated by the reference numeral 81, to clean the television set. The vacuum sweeper tank 81 is preferably mounted on the back of cabinet 14. After the television set is thoroughly cleaned, the table 28 is rotated until the television set is placed in a suitable position somewhere at or between the positions generally indicated by the reference numerals 77 and 79 where the television set is inspected and repaired. After final test, the television set is moved in the direction of the arrow 82 to a storage position indicated generally by the reference numeral 80.

The dollies 40 may be conventional work-supporting tables normally found in shops and the like, the tables being supported on casters, such as those indicated by the reference numeral 83 in FIG. 2.

While there have been discussed above the principles of this invention in connection with specific apparatus, it is to be clearly understood that this description is made by way of example and not as a limitation to the scope of the invention.

What is claimed is:

1. A work bench comprising a stationary pedestal, a table mounted on said pedestal for rotation about a vertical axis, a plurality of dollies supported on wheels, each of said dollies having a portion abuttable with said table, and means for attaching each of said dollies to said table, said dollies being rotatable in unison with said table when attached thereto.

2. A work bench as in claim 1 wherein said table and said dollies have flat, substantially horizontal, upper surfaces the upper surfaces of said dollies being the same height as the surface of said table, said means includes means for releasably attaching each of said dollies to said table.

3. A work bench as in claim 2 wherein said table has a plurality of sides against which said dollies abut and which are of equal length, and wherein one side of each of said dollies is of the same length as the sides of said table against which said dollies abut.

4. A work bench as in claim 1 wherein said pedestal comprises an upstanding post, the axis of said post coinciding with the axis of said pedestal, a stationary cabinet supported on said pedestal above said table, an enclosure surrounding said post, said enclosure having a top, and means rotatably supporting said table on said top.

5. A work bench as in claim 4 wherein said enclosure defines storage space under said table, said storage space, being accessible through an opening in a vertical wall of said enclosure, and wherein said pedestal further comprises a door for said opening.

6. A work bench as in claim 4 wherein said means for rotatably supporting said table comprises an annular, upwardly opening bearing race carried by said top and an annular, downwardly opening bearing race mounted on the underneath side of said table, and roller means carried between said races, said races being concentric with the axis of said pedestal.

7. A work bench as in claim 1 wherein each of said attaching means comprises a keeper firmly attached to said table adjacent to one side thereof, said keeper being carried on the underneath side of said table, a latch carried by each of said dollies adjacent the side of said dolly which abuts said table, said latch being arranged, when actuated, to engage said keeper firmly to hold the dolly on which said latch is carried against said side, and lever means for actuating said latch, said lever means being arranged to extend away from said latch and toward the opposite side of said dolly, said lever means being manually operable from said opposite side.

8. A method for handling equipment to be repaired comprising the steps of mounting the equipment to be repaired on a dolly, connecting said dolly to a table which is arranged to rotate about the axis of a supporting pedestal, performing work on said equipment while on the dolly connected to said table, disconnecting said dolly from said table, and removing said equipment from said dolly.

9. The method of claim 8 in which said dolly and said table are initially physically separated and including the steps of moving said dolly into abutting engagement with said table, and subsequently withdrawing said dolly from said table after being disconnected therefrom.

10. A work bench as in claim 1 wherein said attaching means includes a connecting device having engageable interlocking parts mounted on said table and dollies, respectively.

11. A work bench as in claim 10 wherein said connecting device is a latching mechanism in which one part is movable and another part engageable therewith is fixed.

References Cited

UNITED STATES PATENTS

| | | | |
|---|---|---|---|
| 1,754,094 | 4/1930 | Glass | 108—94 |
| 3,006,108 | 10/1961 | Condit | 108—94 X |
| 3,084,007 | 4/1963 | Fuller et al. | 312—280 X |
| 3,356,434 | 12/1967 | Theodores | 312—250 |

CASMIR A. NUNBERG, *Primary Examiner.*

U.S. Cl. X.R.

108—90; 312—196